United States Patent
Kray et al.

(10) Patent No.: US 9,777,579 B2
(45) Date of Patent: Oct. 3, 2017

(54) ATTACHMENT OF COMPOSITE ARTICLE

(71) Applicant: General Electric Company, Schenectady, NY (US)

(72) Inventors: Nicholas Joseph Kray, Mason, OH (US); Scott Roger Finn, Montgomery, OH (US); Peggy Lynn Baehmann, Glenville, NY (US); Dong-Jin Shim, Cohoes, NY (US); Gregory Carl Gemeinhardt, Park Hills, KY (US)

(73) Assignee: General Electric Company, Schenectady, NY (US)

( * ) Notice: Subject to any disclaimer, the term of this patent is extended or adjusted under 35 U.S.C. 154(b) by 1180 days.

(21) Appl. No.: 13/709,559

(22) Filed: Dec. 10, 2012

(65) Prior Publication Data
US 2014/0161620 A1  Jun. 12, 2014

(51) Int. Cl.
*F01D 5/14* (2006.01)
*F01D 5/28* (2006.01)
*F01D 5/30* (2006.01)

(52) U.S. Cl.
CPC ............ *F01D 5/141* (2013.01); *F01D 5/282* (2013.01); *F01D 5/30* (2013.01);
(Continued)

(58) Field of Classification Search
CPC . F01D 5/282; F01D 5/12; F01D 5/147; F01D 5/30; F01D 5/141; F03D 1/0675;
(Continued)

(56) References Cited

U.S. PATENT DOCUMENTS 3,628,890 A   12/1971   Sayre et al.
3,725,981 A   4/1973    Pinckney
(Continued)

FOREIGN PATENT DOCUMENTS

EP   2458153 A2   5/2012
FR   2664941 A1   1/1992
(Continued)

OTHER PUBLICATIONS

Search Report from PCT/US2013/073506 dated Feb. 20, 2014.
(Continued)

*Primary Examiner* — Igor Kershteyn
(74) *Attorney, Agent, or Firm* — General Electric Company; William Scott Andes (57) ABSTRACT

A composite article including composite component extending heightwise from a component base to a component tip and lengthwise between spaced apart component first and second edges. Component plies having widthwise spaced apart ply first and second sides and ply edges therebetween. Component mounted on a spar which includes a shank extending heightwise into the composite component, tab at upper end of shank and substantially or fully embedded in the composite component, and tab tip. Ply edges of at least a first portion of the plies directly or indirectly contacting or pressing against the tab. Ply edges of at least a second portion of the plies may directly or indirectly contact or press against the tab tip. Ply edges of first portion may press against one or more indented or recessed surfaces in the tab. The composite article may be a composite blade or vane including a composite airfoil.

31 Claims, 10 Drawing Sheets

(52) U.S. Cl.
CPC ....... *F05D 2300/603* (2013.01); *Y02T 50/672* (2013.01); *Y10T 428/24017* (2015.01); *Y10T 428/24182* (2015.01)

(58) Field of Classification Search
CPC ..... Y10T 428/24017; Y10T 428/24182; F05D 2300/603; Y02T 50/672
See application file for complete search history.

(56) References Cited

U.S. PATENT DOCUMENTS

| | | |
|---|---|---|
| 3,737,250 A | 6/1973 | Pilpel et al. |
| 3,752,600 A | 8/1973 | Walsh et al. |
| 3,758,232 A | 9/1973 | Wallett |
| 3,778,185 A | 12/1973 | Plowman et al. |
| 3,799,701 A | 3/1974 | Rothman |
| 3,871,687 A | 3/1975 | Dockree |
| 3,883,267 A * | 5/1975 | Baudier ................. F01D 5/282 416/230 |
| 3,903,578 A | 9/1975 | Rothman |
| 3,923,422 A | 12/1975 | Ianniello et al. |
| 3,984,962 A | 10/1976 | Krohn |
| 4,037,990 A | 7/1977 | Harris |
| 4,070,127 A | 1/1978 | Loomis et al. |
| 4,071,184 A | 1/1978 | Carlson et al. |
| 4,110,056 A | 8/1978 | Stevenson |
| 4,142,554 A | 3/1979 | Washkewicz et al. |
| 4,171,999 A | 10/1979 | Allen |
| 4,185,472 A | 1/1980 | Presta et al. |
| 4,205,927 A | 6/1980 | Simmons |
| 4,211,589 A | 7/1980 | Fisher et al. |
| 4,213,641 A | 7/1980 | Bennett |
| 4,236,386 A | 12/1980 | Yates et al. |
| 4,238,540 A | 12/1980 | Presta et al. |
| 4,247,255 A | 1/1981 | De Rosa |
| 4,251,309 A | 2/1981 | Class et al. |
| 4,259,382 A | 3/1981 | Schwan |
| 4,279,275 A | 7/1981 | Stanwood et al. |
| 4,289,557 A | 9/1981 | Stanwood et al. |
| 4,307,755 A | 12/1981 | Schmidt et al. |
| 4,329,193 A | 5/1982 | Sznopek et al. |
| 4,339,230 A | 7/1982 | Hill |
| 4,362,418 A | 12/1982 | Loomis |
| 4,370,372 A | 1/1983 | Higgins et al. |
| 4,384,802 A | 5/1983 | Lo et al. |
| 4,385,644 A | 5/1983 | Kaempen |
| 4,433,933 A | 2/1984 | Parsons, Jr. et al. |
| 4,469,730 A | 9/1984 | Burhans |
| 4,508,047 A | 4/1985 | Bordat |
| 4,556,365 A | 12/1985 | Mouille et al. |
| 4,556,592 A | 12/1985 | Bannink, Jr. |
| 4,569,165 A | 2/1986 | Baker et al. |
| 4,570,979 A | 2/1986 | Moore |
| 4,579,475 A | 4/1986 | Hart-Smith et al. |
| 4,614,369 A | 9/1986 | Overath et al. |
| 4,619,470 A | 10/1986 | Overath et al. |
| 4,647,078 A | 3/1987 | Lundy |
| 4,648,800 A | 3/1987 | Fradenburgh et al. |
| 4,662,587 A | 5/1987 | Whitener |
| 4,681,647 A | 7/1987 | Kondo et al. |
| 4,701,231 A | 10/1987 | Peters et al. |
| 4,715,560 A | 12/1987 | Loyek |
| 4,722,717 A | 2/1988 | Salzman et al. |
| 4,740,100 A | 4/1988 | Saarela et al. |
| 4,747,806 A | 5/1988 | Krude et al. |
| 4,783,040 A | 11/1988 | Lindberg et al. |
| 4,784,575 A | 11/1988 | Nelson et al. |
| 4,797,064 A | 1/1989 | Ferris et al. |
| 4,810,167 A | 3/1989 | Spoltman et al. |
| 4,813,457 A | 3/1989 | Offringa et al. |
| 4,875,710 A | 10/1989 | Mercado |
| 4,877,376 A | 10/1989 | Sikorski et al. |
| 4,961,687 A | 10/1990 | Bost et al. |
| 4,966,527 A | 10/1990 | Merz |
| 4,974,245 A | 11/1990 | Mioque et al. |
| 5,009,628 A | 4/1991 | Rouillot |
| 5,015,116 A | 5/1991 | Nardone et al. |
| 5,041,318 A | 8/1991 | Hulls |
| 5,043,217 A | 8/1991 | Peters et al. |
| 5,067,875 A | 11/1991 | Hunter et al. |
| 5,076,601 A | 12/1991 | Duplessis |
| 5,082,314 A | 1/1992 | Aubry et al. |
| 5,106,130 A | 4/1992 | Ellsworth et al. |
| 5,110,260 A | 5/1992 | Byrnes et al. |
| 5,118,257 A * | 6/1992 | Blakeley ................. B64C 11/04 29/889.21 |
| 5,129,787 A | 7/1992 | Violette et al. |
| 5,167,742 A | 12/1992 | Peters |
| 5,213,379 A | 5/1993 | Taniguchi et al. |
| 5,269,489 A | 12/1993 | West et al. |
| 5,279,892 A | 1/1994 | Baldwin et al. |
| 5,281,454 A | 1/1994 | Hanson |
| 5,288,109 A | 2/1994 | Auberon et al. |
| 5,303,958 A | 4/1994 | Hyatt et al. |
| 5,314,282 A | 5/1994 | Murphy et al. |
| 5,314,382 A | 5/1994 | Pfeifer |
| 5,318,819 A | 6/1994 | Pai |
| 5,320,579 A | 6/1994 | Hoffmann |
| 5,327,963 A | 7/1994 | Vance, Sr. et al. |
| 5,338,611 A | 8/1994 | Lause et al. |
| 5,340,280 A | 8/1994 | Schilling |
| 5,362,112 A | 11/1994 | Hamilton et al. |
| 5,375,978 A | 12/1994 | Evans et al. |
| 5,378,109 A | 1/1995 | Lallo et al. |
| 5,383,692 A | 1/1995 | Watts |
| 5,383,767 A | 1/1995 | Aubry |
| 5,398,975 A | 3/1995 | Simmons |
| 5,403,161 A | 4/1995 | Nealon et al. |
| 5,407,195 A | 4/1995 | Tiitola et al. |
| 5,429,853 A | 7/1995 | Darrieux |
| 5,431,456 A | 7/1995 | Okumura et al. |
| 5,443,099 A | 8/1995 | Chaussepied et al. |
| 5,458,465 A | 10/1995 | Wieser et al. |
| 5,460,416 A | 10/1995 | Freidrich et al. |
| 5,468,033 A | 11/1995 | Dohrmann |
| 5,505,036 A | 4/1996 | Wiles |
| 5,520,422 A | 5/1996 | Friedrich et al. |
| 5,536,108 A | 7/1996 | Kvalheim |
| 5,542,230 A | 8/1996 | Schuetze |
| 5,551,918 A | 9/1996 | Jones et al. |
| 5,556,565 A | 9/1996 | Kirkwood et al. |
| 5,560,730 A | 10/1996 | Gillard et al. |
| 5,591,084 A | 1/1997 | Poulin et al. |
| 5,632,601 A | 5/1997 | Bodmer et al. |
| 5,634,771 A * | 6/1997 | Howard ................. F01D 5/147 416/229 R |
| 5,685,576 A | 11/1997 | Wolfe et al. |
| 5,716,077 A | 2/1998 | Friedrich et al. |
| 5,725,434 A | 3/1998 | Haben et al. |
| 5,738,494 A | 4/1998 | Schmaling |
| 5,798,153 A | 8/1998 | Fay et al. |
| 5,800,128 A | 9/1998 | Bodmer et al. |
| 5,813,467 A | 9/1998 | Anderson et al. |
| 5,820,344 A | 10/1998 | Hamilton et al. |
| 5,824,179 A | 10/1998 | Greig |
| 5,836,825 A | 11/1998 | Yamane |
| 5,851,152 A | 12/1998 | Ilzhoefer et al. |
| 5,866,272 A | 2/1999 | Westre et al. |
| 5,868,886 A | 2/1999 | Alston et al. |
| 5,895,079 A | 4/1999 | Carstensen et al. |
| 5,944,441 A | 8/1999 | Schuetze |
| 6,039,538 A | 3/2000 | Bansemir |
| 6,042,916 A | 3/2000 | Godbehere |
| 6,068,902 A | 5/2000 | Vasiliev et al. |
| 6,168,379 B1 | 1/2001 | Bauer |
| 6,176,681 B1 | 1/2001 | Stroemberg et al. |
| 6,190,263 B1 | 2/2001 | Kimoto et al. |
| 6,213,719 B1 | 4/2001 | Violette et al. |
| 6,305,905 B1 | 10/2001 | Nagle et al. |
| 6,431,837 B1 | 8/2002 | Velicki |
| 6,502,788 B2 | 1/2003 | Noda et al. |
| 6,735,866 B2 | 5/2004 | Nogueroles et al. |
| 7,087,296 B2 | 8/2006 | Porter |
| 7,575,417 B2 | 8/2009 | Finn et al. |

(56) References Cited

U.S. PATENT DOCUMENTS

| | | |
|---|---|---|
| 8,075,274 B2 | 12/2011 | Carvalho |
| 2001/0050469 A1 | 12/2001 | Bernhardt |
| 2002/0008177 A1 | 1/2002 | Violette |
| 2003/0067167 A1 | 4/2003 | Massaria |
| 2003/0090108 A1 | 5/2003 | Palsson |
| 2003/0134090 A1 | 7/2003 | Tate |
| 2003/0205011 A1 | 11/2003 | Bequet |
| 2003/0230893 A1 | 12/2003 | Song et al. |
| 2004/0061024 A1 | 4/2004 | Arulf et al. |
| 2004/0062655 A1 | 4/2004 | Potter et al. |
| 2004/0213953 A1 | 10/2004 | Brantley et al. |
| 2005/0084379 A1 | 4/2005 | Schreiber |
| 2005/0121913 A1 | 6/2005 | Smahl |
| 2005/0257847 A1 | 11/2005 | Francesco et al. |
| 2006/0083907 A1 | 4/2006 | Bech et al. |
| 2006/0113706 A1 | 6/2006 | Chevin et al. |
| 2006/0258469 A1 | 11/2006 | Dewhirst et al. |
| 2007/0175966 A1 | 8/2007 | Barnes |
| 2008/0001396 A1 | 1/2008 | Nish et al. |
| 2008/0012329 A1 | 1/2008 | Dewhirst |
| 2008/0115454 A1 | 5/2008 | Xie |
| 2008/0228288 A1 | 9/2008 | Nelson et al. |
| 2008/0302914 A1 | 12/2008 | Wagner |
| 2009/0047100 A1 | 2/2009 | Keener |
| 2009/0087259 A1 | 4/2009 | Bettinger |
| 2009/0126180 A1 | 5/2009 | Keener |
| 2009/0148647 A1 | 6/2009 | Jones et al. |
| 2011/0129348 A1 | 6/2011 | Parkin et al. |

FOREIGN PATENT DOCUMENTS

| | | |
|---|---|---|
| GB | 871066 A | 6/1961 |
| GB | 2249592 A | 5/1992 |

OTHER PUBLICATIONS

"Design of Composite-Material Plates for Maximum Uniaxial Compressive Buckling Load", by Timothy L. C. Chen and Charles W. Bert, Oaklahoma Academy of Science Proceedings, Sep. 25, 2012, 104-107.

PCT Search Report and Written Opinion issued in connection with related PCT Application No. PCT/US2013/073501 dated Oct. 8, 2014.

PCT Preliminary Report on Patentability issued in connection with related PCT Application No. PCT/US2013/073501 dated Jun. 25, 2015.

Unofficial English Translation of Chinese Office Action issued in connection with related CN Application No. 201380064601.2 dated Nov. 4, 2015.

Canadian Office Action issued in connection with related CA Application No. 2894155 dated Jun. 2, 2016.

\* cited by examiner

ATTACHMENT OF COMPOSITE ARTICLE

BACKGROUND OF THE INVENTION

Field of the Invention

The invention relates to gas turbine engine composite airfoils and, particularly, for metallic attachments for composite airfoils for mounting in aircraft gas turbine engines.

Description of Related Art

Bypass gas turbine engines of the turbofan type generally includes a forward fan and booster compressor, a middle core engine, and an aft low pressure power turbine. A low pressure turbine rotatably drives the fan and booster compressor via a low pressure shaft, all of which form the low pressure rotor. Composite airfoils have been developed for and used in blades for rotatable stages of the booster compressor and in stator vanes disposed between and upstream and downstream of the blades as well in other sections of the engine such as in the fan section (fan outlet guide vanes).

It is known to manufacture aircraft gas turbine engine blade and vane airfoils from composite materials. It is difficult to attach the composite airfoils to a metallic attachment for mounting the blade or vane to a metallic rotor or stator portion of the engine. This is a challenge due to the magnitude of loads and limited size of the components. Typically, the attachments of these composite parts are the challenging part of that implementation. Typically, it is desired to have an integral composite/metallic system that takes advantage of the composite weight reduction and complex machining of a metallic interface. Joining these two systems in the past has been by simple adhesive bonds. These bonds are subject to forces and moments that tend to dislodge the composite airfoils from a metallic mount of the blade or vane.

It is highly desirable to provide mounts for securely and robustly mounting composite airfoils in both gas turbine engine rotor and fan frame assemblies that resist forces and moments that tend to dislodge the composite airfoils from a metallic mount of the blade or vane and that will enhance the life of the airfoils and the fan frame assembly. In a broader sense, it is highly desirable to provide mounts for securely and robustly mounting composite parts that resist forces and moments that tend to dislodge composite elements from metallic mounts on the part.

SUMMARY OF THE INVENTION

A composite article includes a composite component extending heightwise from a component base to a component tip and lengthwise between spaced apart component first and second edges. The composite component includes plies having widthwise spaced apart ply first and second sides and ply edges therebetween. The composite component is mounted on a spar including a shank extending heightwise from below the component base up through the component base into the composite component, a tab at an upper end of shank and substantially or fully embedded in the composite component, the tab including heightwise spaced apart tab base and tab tip, and the ply edges of at least a first portion of the plies directly or indirectly contacting or pressing against the tab.

The composite article may include one or more indented or recessed surfaces in the tab between heightwise spaced apart tab base and tab tip and the ply edges of at least a first portion of the plies directly or indirectly contact or press against the indented or recessed surfaces and one or more indented or recessed surfaces in the tab between heightwise spaced apart tab base and tab tip.

The ply edges of at least a second portion of the plies may directly or indirectly contact or press against the tab tip. The indented or recessed surfaces may define corresponding indentations or recesses having circular cross sections.

The one or more indented or recessed surfaces of the composite article may include one or more widthwise spaced apart indented or recessed surfaces defining a widthwise taper between the tab base. The taper may taper down in thickness from the tab tip towards the tab base. The ply edges of at least a second portion of the plies may directly or indirectly contact or press against the tab tip.

The composite article may include hooking means for hooking some of the plies of the composite airfoil and be disposed along widthwise spaced apart tab first and second sides of the tab. The hooking means includes hooks disposed along lengthwise spaced apart tab first and second edges of the tab and the one or more indented or recessed surfaces include corners between the hooks and the widthwise spaced apart tab first and second sides. The hooks may include continuous leading first and second edge hook disposed along the lengthwise spaced apart tab first and second edges respectively. Another embodiment of the hooks may include alternating first and second side hooks extending alternatingly outwardly from the tab first and second sides respectively along each of the lengthwise spaced apart tab first and second edges. The hooks may be stepped hooks and each of the stepped hooks include hook steps with runs widthwise separated by rises.

The composite article may be a composite blade or vane including a composite airfoil having widthwise spaced apart airfoil pressure and suction sides extending heightwise or spanwise and outwardly from an airfoil base to an airfoil tip and lengthwise or chordwise between spaced apart airfoil leading and trailing edges. The composite airfoil includes plies having widthwise spaced apart ply pressure and suction sides and ply edges therebetween. The composite airfoil is mounted on a spar including a shank extending heightwise from below the airfoil base up through the airfoil base into the composite airfoil. A tab at an upper end of the shank is substantially or fully embedded in the composite airfoil. One or more indented or recessed surfaces are in the tab between heightwise spaced apart tab base and tab tip. The ply edges of at least a first portion of the plies directly or indirectly contact or press against the indented or recessed surfaces. The spar may be metallic.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
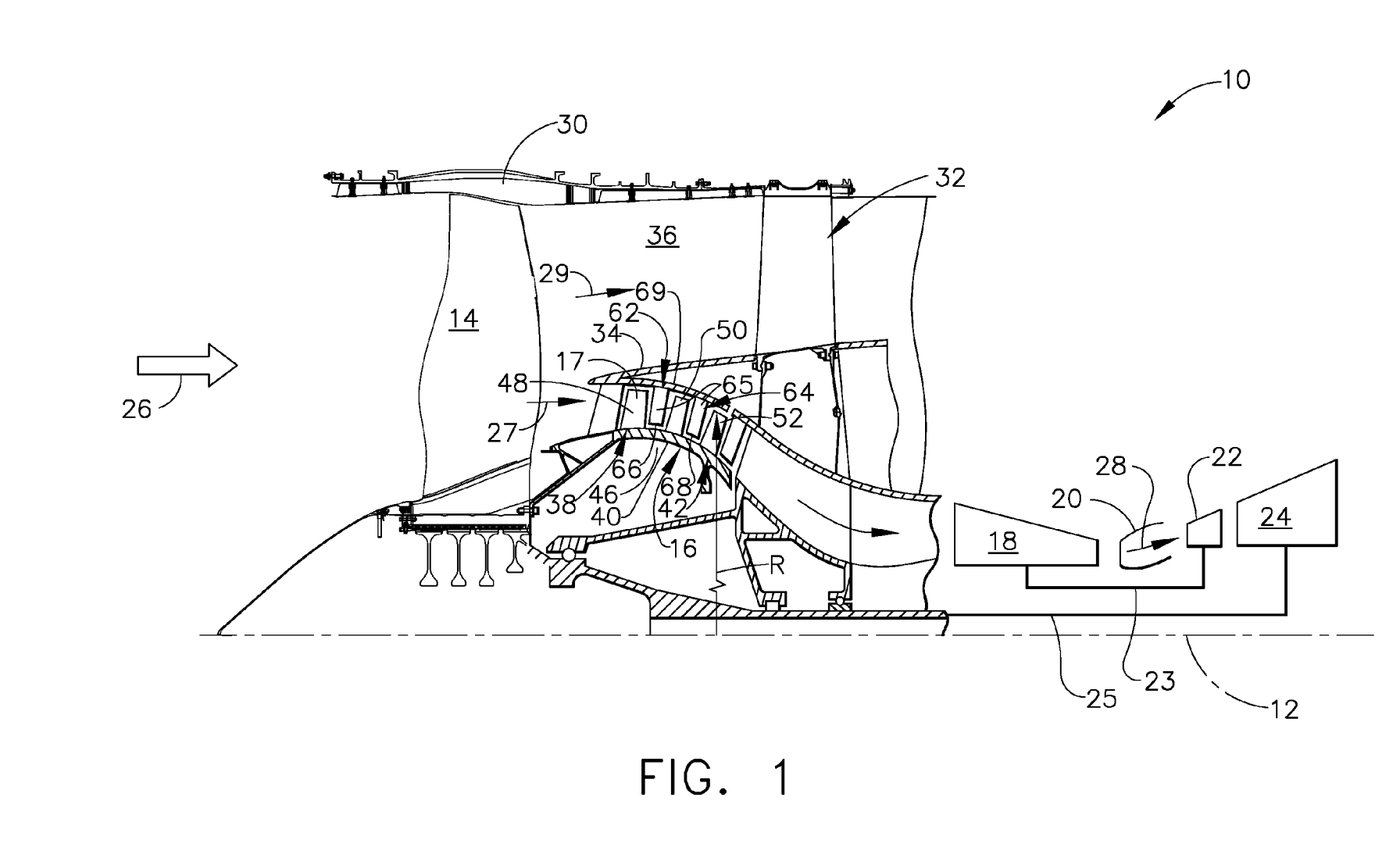
FIG. 1 is a longitudinal part sectional and part diagrammatical view illustration of an exemplary embodiment of an aircraft turbofan gas turbine engine having booster blades and vanes having composite airfoils.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a booster or a low pressure compressor 16, a high pressure compressor 18, a combustor 20, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and booster or low pressure compressor 16.

In typical operation, air 26 is pressurized by the fan 14 and an inner portion of this air is channeled through the low pressure compressor 16 which further pressurizes the air. The pressurized air is then flowed to the high pressure compressor 18 which further pressurizes the air. The pressurized air is mixed with fuel in the combustor 20 for generating hot combustion gases 28 that flow downstream in turn through the HPT 22 and the LPT 24. Energy is extracted in the two turbines for powering the fan 14, low pressure compressor 16, and the high pressure compressor 18. A flow splitter 34 surrounding the booster compressor 16 immediately behind the fan 14 includes a sharp leading edge which splits the fan air 26 pressurized by the fan 14 into a radially inner stream 27 channeled through the booster compressor 16 and a radially outer stream 29 channeled through the bypass duct 36.

A fan nacelle 30 surrounding the fan 14 is supported by an annular fan frame 32. The low pressure compressor 16 is suitably joined to the fan 14 forward of the fan frame 32, is disposed radially inboard of the annular flow splitter 34, and is spaced radially inwardly from an inner surface of the fan nacelle 30 to partially define an annular fan bypass duct 36 therebetween. The fan frame 32 supports the nacelle 30.

The compressor 16 has rotatable first, second, and third compressor stages 38, 40, 42 with first, second, and third compressor blade rows 48, 50, 52, respectively. Compressor blades 17 of the first, second, and third compressor blade rows 48, 50, 52 extend radially outwardly from a rotatable hub 46 connected to the fan 14. The compressor 16 has non-rotatable first and second vane stages 62, 64 with first and second vane rows 66, 68, respectively. Compressor vanes 65 of the first and second vane stages 62, 64 extend radially inwardly from a non-rotatable shell or outer band 69 or other annular structure fixedly connected to a forward or fan frame 32. The first, second, and third compressor blade rows 48, 50, 52 are interdigitated with the first and second vane rows 66, 68. The compressor blades and vanes 17, 65 may include composite airfoils. It is also known to mount compressor blades having composite airfoils to disks or drums of gas turbine engines.

Figure 3:
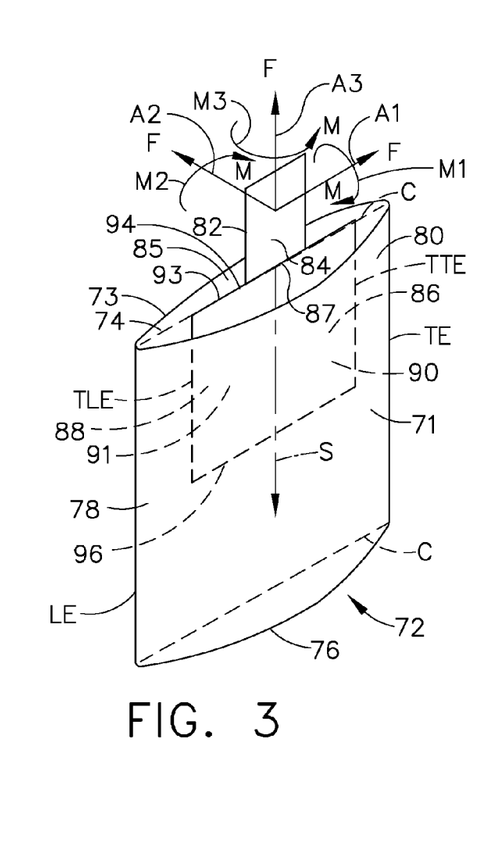
FIG. 3 is a diagrammatical perspective view illustration of a composite airfoil having a metallic shank with an enlarged tab inserted therein suitable for use with one of the booster blades and vanes illustrated in FIG. 1.
Figure 4:
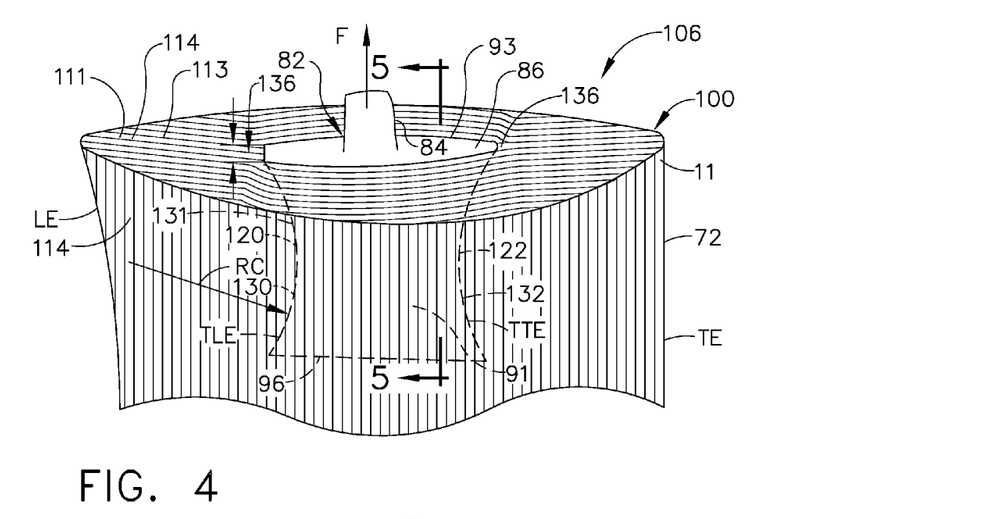
FIG. 4 is an enlarged diagrammatical perspective view illustration of the composite airfoil and the metallic shank illustrated in FIG. 3.
Figure 5:
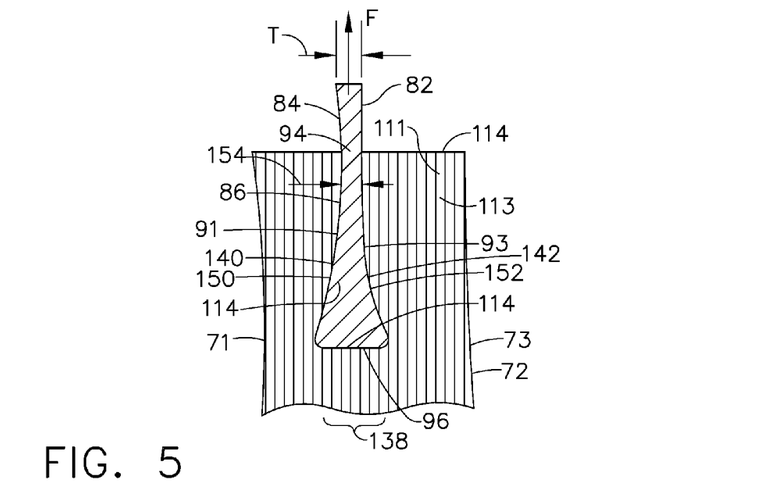
FIG. 5 is a diagrammatical cross sectional view illustration of the composite airfoil and the metallic shank through 5-5 in FIG. 4.

Illustrated in FIGS. 3-5 is a composite airfoil 72 that is designed for use in a gas turbine engine blade or vane exemplified by the compressor blades and vanes 17, 65 illustrated in FIG. 1 and described above. The composite airfoil 72 includes widthwise spaced apart airfoil pressure and suction sides 71, 73 extending heightwise or spanwise and outwardly from an airfoil base 74 along an airfoil span S to an airfoil tip 76. The exemplary airfoil pressure and suction sides 71, 73 illustrated herein may be concave and convex respectively. The composite airfoil 72 includes lengthwise or chordwise spaced apart airfoil leading and trailing edges LE, TE at or near forward and aft ends 78, 80 of the airfoil 72. A chord C is defined as a line between the airfoil leading and trailing edges LE, TE of an airfoil cross section 85 of the airfoil 72.

The composite airfoil 72 is mounted on a spar 82 including a shank 84 extending from below the airfoil base 74 up through the airfoil base 74 into the composite airfoil 72. The spar 82 may be made of a material substantially harder than that of the composite airfoil 72. The spar material may be metallic. The spar 82 includes a tab 86 at an upper end 87 of the shank 84. The tab 86 is either substantially or fully embedded in the composite airfoil 72 and may be substantially wider than the shank 84 in a generally chordal direction between the airfoil leading and trailing edges LE, TE.

The tab 86 includes widthwise spaced apart tab pressure and suction sides 91, 93 extending outwardly from a tab base 94 to a tab tip 96. The tab pressure and suction sides 91, 93 correspond to the airfoil pressure and suction sides 71, 73. The tab 86 includes widthwise spaced apart tab leading and trailing edges TLE, TTE at or near tab forward and aft ends 88, 90 of the tab 86. The exemplary embodiment of the tab 86 is fully embedded in the composite airfoil 72 and the tab base 94 (as illustrated herein) is flush with the airfoil base 74. The tab 86 may be embedded deeper into the composite airfoil 72 such that the tab base 94 is spaced inwardly of airfoil base 74.

The spar 82 and the tab 86 provide a means to mount the composite airfoil 72 on a rotor or static structure of the engine. The tab 86 is designed to resist forces F and moments M illustrated in FIG. 3 that tend to loosen dislodge the composite airfoil 72 from the spar 82 and the tab 86. The forces F produce the moments M because the vane or blade containing the spar 82 is mounted cantilevered from the rotor or static structure of the engine. Forces F generally act along three orthogonal axis which are indicated herein as a lengthwise or axial first axis A1 which is generally parallel to the chord C between the airfoil leading and trailing edges LE, TE, a widthwise or circumferential second axis A2 which is generally tangential to a circumference defined by a radius R (illustrated in FIG. 1) normal to the engine centerline axis 12, and a heightwise or radial third axis A3 along the radius R. Moments M are indicated as first, second, and third moments M1, M2, M3 about the first, second, and third axes A1, A2, A3 respectively.

Figure 8:
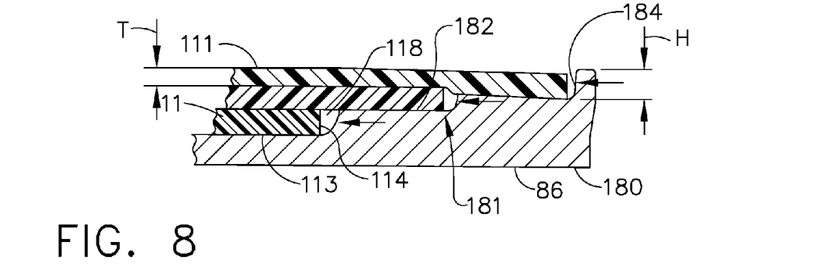
FIG. 8 is a diagrammatical cross sectional view illustration of alternative hooks for the tab illustrated in FIG. 6.

The composite airfoil 72 is made up of filament reinforced laminations 100 formed from a composite material lay-up 106 of filament reinforced composite plies 11 (illustrated in FIG. 8). As used herein, the terms "lamination" and "ply" are synonymous. The plies 11 are generally all made from a unidirectional fiber filament ply woven material which may be in the form of a tape or sheet of material. The plies 11 essentially form the composite airfoil 72. Each of the filament reinforced laminations 100 or plies 11 have widthwise spaced apart ply pressure and suction sides 111, 113 and ply edges 114. Two or more of the ply edges 114, at least one ply pressure side 111, and at least one ply suction side 113 directly or indirectly presses against the tab 86 to help mechanically secure the composite airfoil to the tab 86. The ply edges 114 indirectly presses against the tab 86 by pressing against cured or hardened resin filled pocket 118 between the ply edge 114 and the tab 86 (illustrated in FIG. 8). During manufacturing the plies are layed up around and against the spar and tab and then cured.

Referring to FIGS. 3-5, the tab 86 is shaped to provide mechanical locking of the composite airfoil 72 to the tab 86. A first portion 136 of the plies 11 terminate at the tab 86 along the tab 86 and more particularly along one or both of the leading and trailing edges TLE, TTE of the tab 86. Their ply edges 114 directly or indirectly contact or press against the tab 86. A second portion 138 of the plies 11 have ply edges 114 that directly or indirectly contact or press against the tab tip 96 of the tab 86. This mechanically locks the composite airfoil 72 to the tab 86.

The tab 86 has forward and aft indented or recessed surfaces 120, 122 between the tab base 94 and the tab tip 96. The forward and aft indented or recessed surfaces 120, 122 are indented or recessed inwardly into the tab 86 from the tab leading and trailing edges TLE, TTE at or near the tab base 94 and/or the tab tip 96. The forward and aft indented or recessed surfaces 120, 122 are illustrated herein as being along the tab leading and trailing edges TLE, TTE as illustrated in FIG. 4 and being recessed from near both the tab base 94 and the tab tip 96. The recessed surfaces may be inwardly curved and extend lengthwise and spanwise or heightwise. The lengthwise or heightwise forward and aft recessed surfaces 120, 122 define forward and aft indentations or recesses 130, 132 and may have circular cross sections 131 indicated by a radius of curvature RC as illustrated in FIG. 4 along the tab leading and trailing edges TLE, TTE of the tab 86.

The exemplary tab 86 illustrated herein may also have in addition or alone widthwise spaced apart first and second or pressure and suction side recessed surfaces 140, 142 of the tab 86 between the tab base 94 and the tab tip 96 and between the tab leading and trailing edges TLE, TTE as illustrated in FIGS. 4 and 5. The pressure and suction recessed surfaces 140, 142 are along the tab pressure and suction sides 91, 93 respectively of the tab 86. The pressure and suction recessed surfaces 140, 142 are recessed into the tab 86 and away from widthwise spaced apart airfoil pressure and suction sides 71, 73 respectively of the composite airfoil 72. The tab 86 tapers widthwise inwardly from near the tab tip 96 to the tab base 94 as defined by the pressure and suction recessed surfaces 140, 142. The pressure and suction recessed surfaces 140, 142 define pressure and suction side recesses 150, 152 in the tab 86 and a widthwise taper 154 having a narrowing widthwise thickness T. The exemplary embodiment of the taper 154 illustrated herein tapers down in thickness from the tab tip 96 towards the tab base 94.

The composite airfoil 72 includes many of the plies 11 that directly or indirectly press against the forward and aft indented or recessed surfaces 120, 122 of the tab 86 in the forward and aft recesses 130, 132 and in the pressure and suction side recesses 150, 152 as illustrated in FIGS. 4 and 5. This heightwise and widthwise mechanically locks the composite airfoil 72 to the tab 86. A first portion 136 of the plies 11 terminate at the tab 86 in aft recess 132 and their ply edges 114 directly or indirectly contact or press against the tab 86. A second portion 138 of the plies 11 have ply edges 114 that directly or indirectly contact or press against the tab tip 96 of the tab 86. This further helps mechanically lock the composite airfoil 72 to the tab 86.

Figure 6:
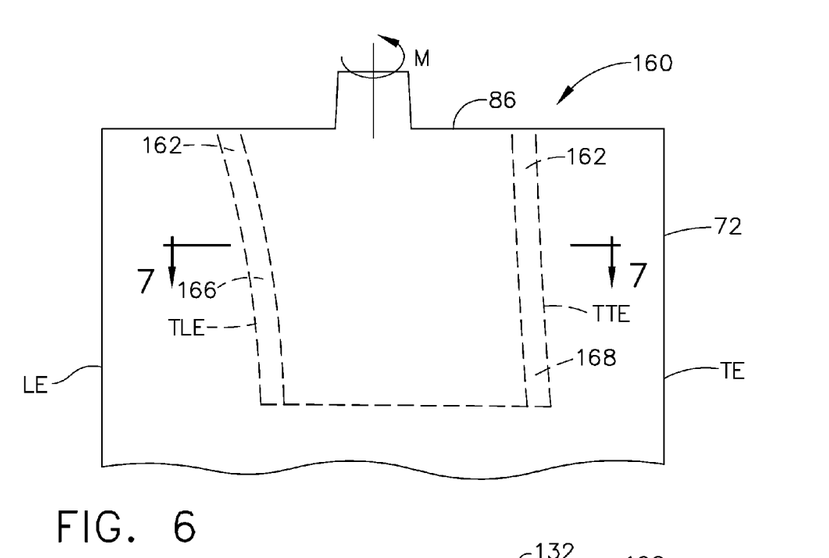
FIG. 6 is a diagrammatical cross sectional view illustration of the composite airfoil and the metallic shank with the tab having hooks at leading and trailing edges of the tab.

Illustrated in FIG. 6 is a hooking means 160 for hooking the plies 11 of the composite airfoil 72 to counter a moment M indicated in the FIG. Hooks 162 of hooking means 160 are indicated between the dashed lines and the tab leading and trailing edges TLE, TTE. The hooks 162 may include a long continuous leading edge hook 166 and a long continuous trailing edge hook 168 indicated in solid line in FIG. 7 at the tab leading and trailing edges TLE, TTE respectively.

Figure 7:
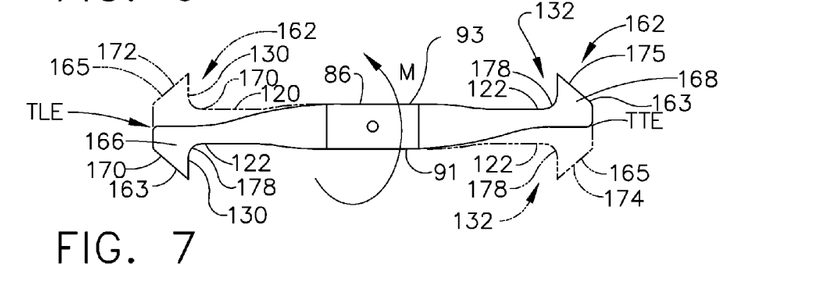
FIG. 7 is a diagrammatical cross sectional view illustration of the tab through 6-6 in FIG. 6.

Alternatively, the hooks 162 may be arranged with alternating pressure and suction side hooks 163, 165 extending alternatingly outwardly from the tab pressure and suction sides 91, 93 along each of the tab leading and trailing edges TLE, TTE as illustrated in FIG. 7. This arrangement of the hooks 162 includes leading edge pressure and suction side hooks 170, 172 extending alternatingly outwardly from the tab pressure and suction sides 91, 93 and trailing edge pressure and suction side hooks 174, 175 extending alternatingly outwardly from the tab pressure and suction sides 91, 93 along the tab leading and trailing edges TLE, TTE respectively. One set of the leading edge pressure side hook 170 and trailing edge suction side hook 175 extending outwardly from the tab pressure and suction sides 91, 93 respectively are indicated in solid line in FIG. 7. An alternating set of the leading suction side hook 170 and trailing edge pressure side hook 174 extending outwardly from the tab suction and pressure sides 93, 91 respectively are indicated in dashed line in FIG. 7. The forward and aft recessed surfaces 120, 122 and the forward and aft indentations or recesses 130, 132 include corners 178 between the forward and aft or pressure and suction trailing edge hook 174, 175 and the widthwise spaced apart tab first and second or pressure and suction sides 91, 93.

Illustrated in FIG. 8 is a stepped hook 180 which is an alternative to the hooks 162 illustrated in FIGS. 6 and 7. The stepped hook 180 includes hook steps 181 with runs 182 widthwise separated by rises 184. The rises 184 have a height H equal to or one or more times larger than a thickness T of the plies 11. The ply edges 114 of the plies 11 in the hook steps 181 directly or indirectly contact or press against the rises 184 to help mechanically secure the composite airfoil to the tab 86. The ply edges 114 indirectly contact or press against the tab 86 by contacting or pressing against cured or hardened resin filled pockets 118 between the ply edges 114 and rises 184.

Figure 9:
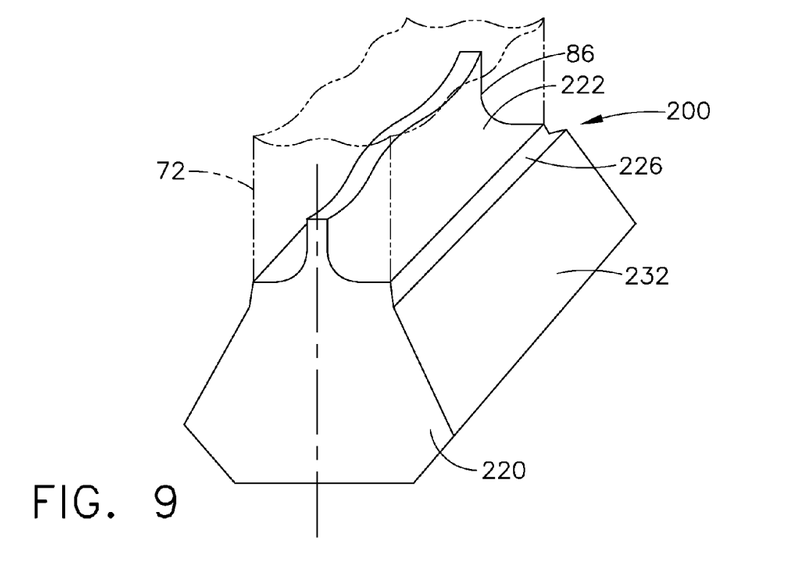
FIG. 9 is a diagrammatical perspective view illustration of a dovetail root for mounting the composite airfoil illustrated in FIG. 3.
Figure 10:
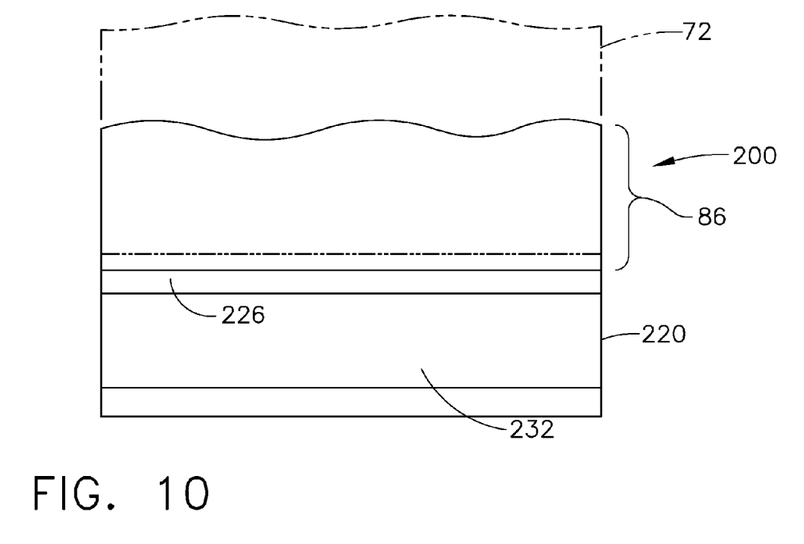
FIG. 10 is a diagrammatical side view illustration the dovetail root illustrated in FIG. 9.
Figure 11:
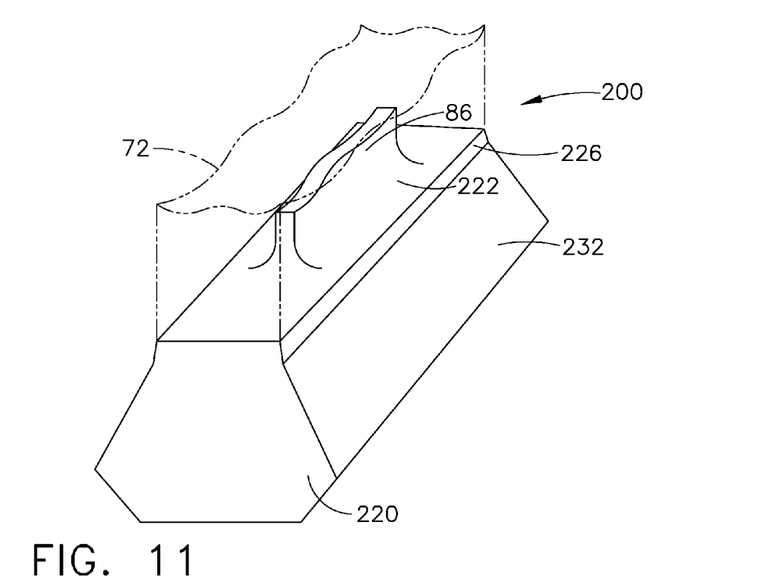
FIG. 11 is a diagrammatical perspective view illustration of a short connector between the dovetail root and tab for the composite airfoil illustrated in FIG. 3.
Figure 12:
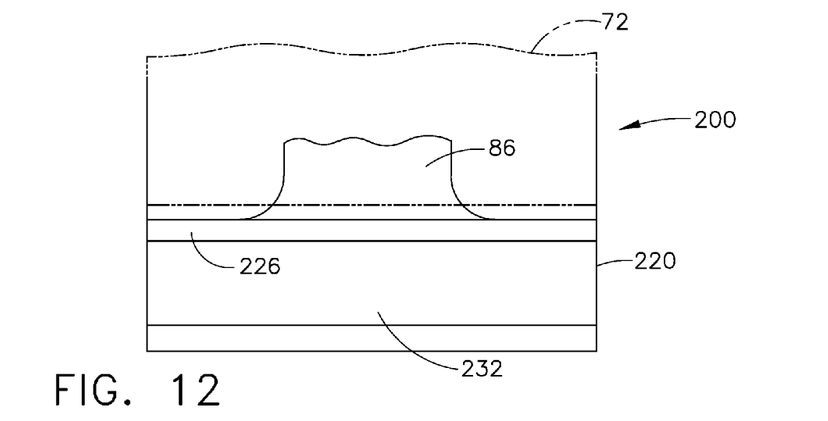
FIG. 12 is a diagrammatical side view illustration the dovetail root illustrated in FIG. 11.
Figure 19:
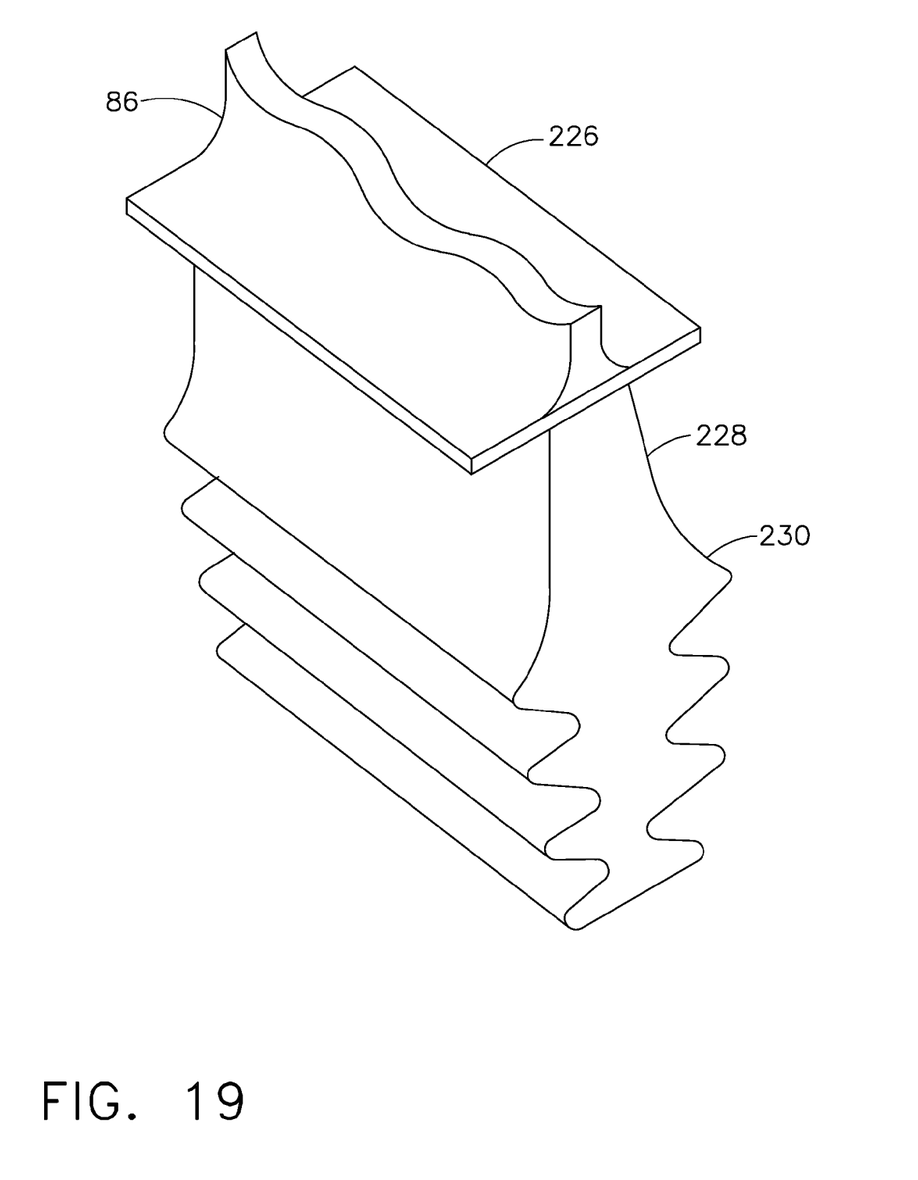
FIG. 19 is a diagrammatical cross sectional view illustration of a fir tree root connection of the composite airfoil illustrated in FIG. 3.

Illustrated in FIGS. 9-12 are different designs for the blade 200 containing the composite airfoil 72. The shank 84 includes a root 220 attached to and preferably integral with a lower end 222 of the tab 86. The root is used to mount the blade to a rotor hub or disk. The root 220 is illustrated in these FIGS. as a dovetail root 228 including a dovetail 232 as is commonly known in the art. The tab 86 extends upwardly and the dovetail 232 extends downwardly from a platform 226 of the shank 84. A long tab 86 is illustrated in FIGS. 9 and 10 and a shorter tab 86 is illustrated in FIGS. 11 and 12. The longer tab 86 is coextensive with the root 228. Illustrated in FIG. 19 is a fir tree root 230 attached to and preferably integral with a lower end 222 of the shank 84. The fir tree root 230 is another type of root well known in the art and used to mount the blade to a rotor hub or disk.

Figure 13:
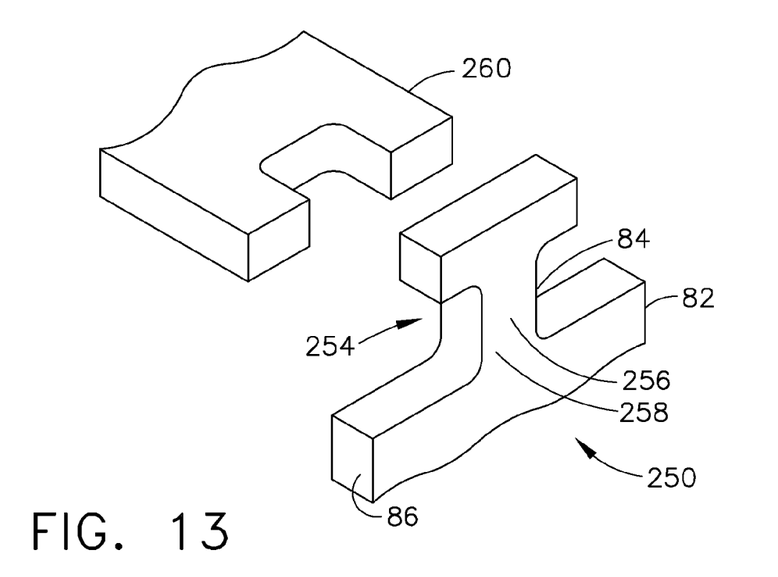
FIG. 13 is a diagrammatical perspective exploded view illustration of a connection between the shank and a stator band for the composite airfoil illustrated in FIG. 3.
Figure 14:
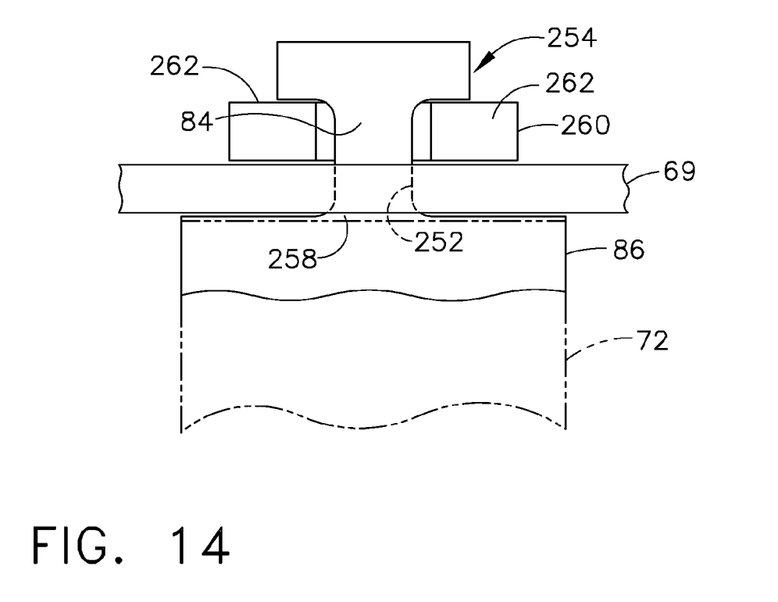
FIG. 14 is a diagrammatical cross sectional view illustration the connection illustrated in FIG. 13.
Figure 15:
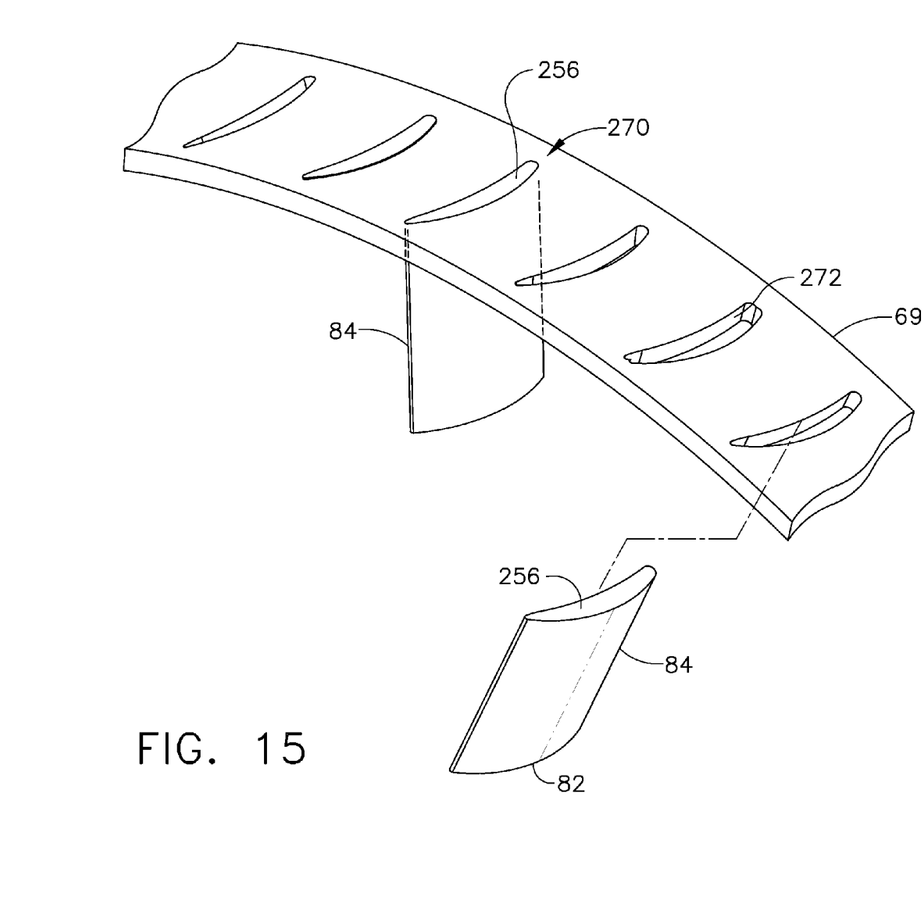
FIG. 15 is a diagrammatical cross sectional view illustration of a stator band and shank for a braze joint connection between the shank and the band for the composite airfoil illustrated in FIG. 3.

Illustrated in FIGS. 13 and 14 is a clipped connection 250 of the shank 84 of the spar 82 disposed through a mounting hole 252 in the outer band 69, illustrated in FIGS. 1 and 15. The clipped connection 250 is used to mount a compressor vanes 65 the outer band 69. T-head 254 is located at an upper end 256 of the shank 84 and the tab 86 is located at a lower end 258 of the shank 84. A U-clip 260 is disposed around the shank 84 and between legs 262 of the T-head 254 the outer band 69.

Figure 16:
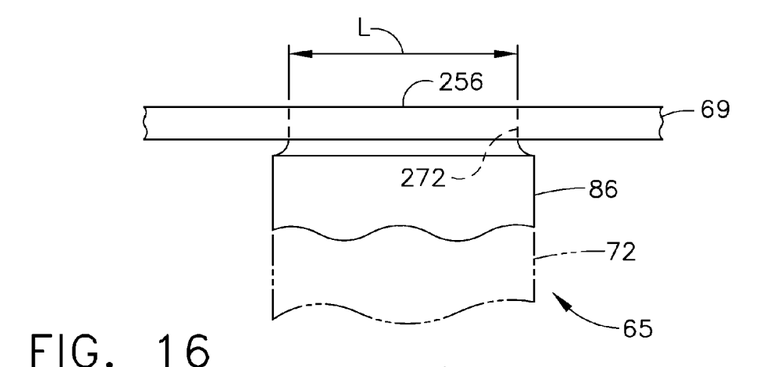
FIG. 16 is a diagrammatical cross sectional view illustration of a braze joint connection between the shank and a stator band for the composite airfoil illustrated in FIG. 3.
Figure 17:
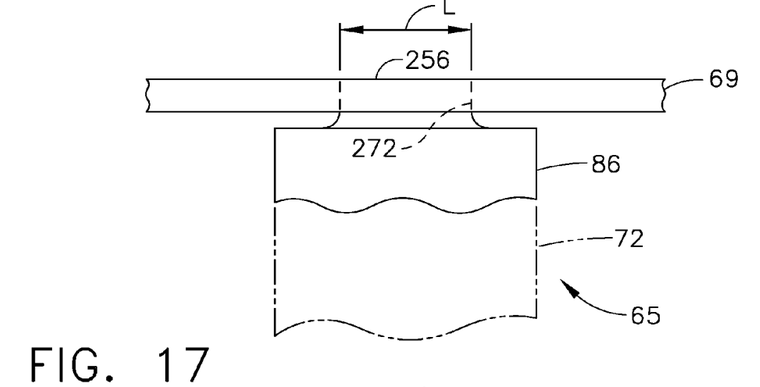
FIG. 17 is a diagrammatical cross sectional view illustration of a short braze joint connection between the shank and a stator band for the composite airfoil illustrated in FIG. 3.
Figure 18:
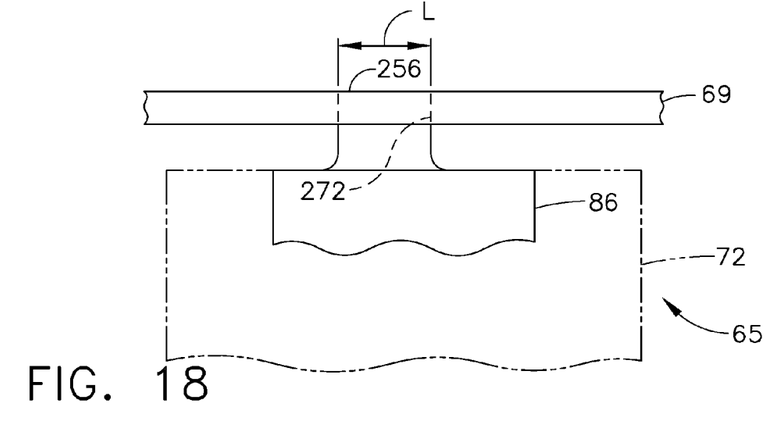
FIG. 18 is a diagrammatical cross sectional view illustration of a short braze joint connection with a metallurgical bond between the shank and a stator band for the composite airfoil illustrated in FIG. 3.

Illustrated in FIGS. 15-18 are brazed connections 270 between the shank 84 of the spar 82 and the outer band 69. An upper end 256 of the shank 84 is disposed through and brazed into an elongated hole 272 in the outer band 69. The brazed connection 270 is illustrated herein for mounting a compressor vanes 65 the outer band 69. Illustrated in FIGS. 16-18 is how the shank 84 may vary in length L even as the tab 86 and the composite airfoil 72 remain unchanged.

Figure 2:
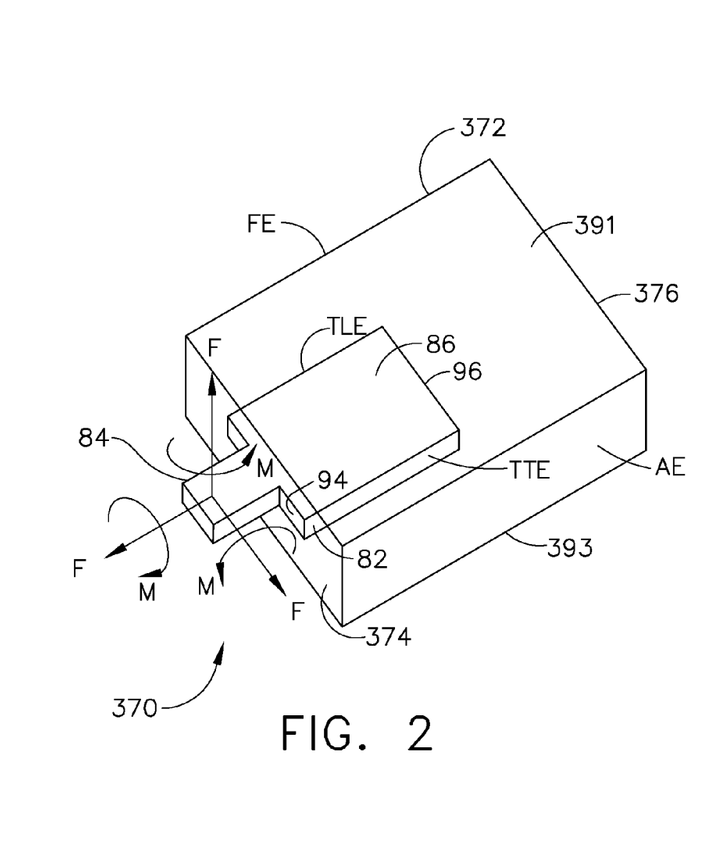
FIG. 2 is a diagrammatical perspective view illustration of a composite article having a metallic shank with an enlarged tab inserted in a composite element of the article.

Illustrated in FIG. 2 is a more general composite article 370 including a composite component 372 extending heightwise from an component base 374 to an component tip 376 and lengthwise between spaced apart component first and second edges LE, TE. The composite component 372 is made up of filament reinforced laminations 100 formed from a composite material lay-up 106 of filament reinforced composite plies 11 as those illustrated in FIG. 8. Each of the filament reinforced laminations 100 or plies 11 have widthwise spaced apart ply first and second sides 111, 113 and ply edges 114.

Referring to FIG. 2, the composite component 372 is mounted on a spar 82 including a shank 84 extending from below the component base 374 up through the component base 374 into the composite component 372. The spar 82 includes a tab 86 at an upper end 87 of shank 84. The tab 86 is either substantially or fully embedded in the composite component 372 and may be substantially wider than the shank 84 in a generally lengthwise direction between forward and aft edges FE, AE of the composite component 372. The tab 86 includes widthwise spaced apart tab first and second sides 391, 393 extending outwardly from a tab base 94 to a tab tip 96 and lengthwise between spaced apart tab first and second leading and trailing edges TLE, TTE. The tab first and second sides 391, 393 correspond to the ply first and second sides 111, 113. The spar 82, as disclosed above, is made of a material substantially harder than that of the component 372. The spar material may be metallic.

Two or more of the ply edges 114, at least one ply first side 111, and at least one ply second side 113 directly or indirectly press against the tab 86 to help mechanically secure the composite component 372 to the tab 86. The ply edges 114 indirectly press against the tab 86 by pressing against cured or hardened resin filled pocket 118 between the ply edge 114 and the tab 86. The composite component 372 is mounted and mechanically secured to the tab 86 as described above for the composite airfoil 72.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A composite article comprising:
    a composite component extending heightwise from a component base to a component tip and lengthwise between spaced apart component first and second edges,
    the composite component including plies having widthwise spaced apart ply first and second sides and ply edges therebetween,
    the composite component mounted on a spar including a shank extending heightwise from below the component base up through the component base into the composite component,
    a tab at an upper end of shank and substantially or fully embedded in the composite component,
    the tab including heightwise spaced apart tab base and tab tip, and
    the ply edges of at least a first portion of the plies directly or indirectly contacting or pressing against the tab.

2. The composite article as claimed in claim 1 further comprising hooking means for hooking some of the plies of the composite airfoil,
    the hooking means disposed along widthwise spaced apart tab first and second sides of the tab,
    the hooking means including hooks disposed along lengthwise spaced apart tab first and second edges, and
    the hooking means having one or more indented or recessed surfaces including corners between the hooks and the widthwise spaced apart tab first and second sides.

3. The composite article as claimed in claim 2 further comprising the hooks including continuous leading first and second edge hook disposed along the lengthwise spaced apart tab first and second edges respectively.

4. The composite article as claimed in claim 2 further comprising the hooks including alternating first and second side hooks extending alternatingly outwardly from the tab first and second sides respectively along each of the lengthwise spaced apart tab first and second edges.

5. The composite article as claimed in claim 4 further comprising the hooks being stepped hooks and each of the stepped hooks including hook steps with runs widthwise separated by rises.

6. The composite article as claimed in claim 5 further comprising the rises having a height equal to or one or more times greater than a thickness of the plies.

7. The composite article as claimed in claim 1 further comprising the ply edges of at least a second portion of the plies directly or indirectly contacting or pressing against the tab tip.

8. The composite article as claimed in claim 1 further comprising:
one or more indented or recessed surfaces in the tab between heightwise spaced apart tab base and tab tip, and
the ply edges of at least a first portion of the plies directly or indirectly contacting or pressing against the indented or recessed surfaces.

9. The composite article as claimed in claim 8 further comprising the ply edges of at least a second portion of the plies directly or indirectly contacting or pressing against the tab tip.

10. The composite article as claimed in claim 8 further comprising the one or more indented or recessed surfaces defining corresponding one or more indentations or recesses having circular cross sections.

11. The composite article as claimed in claim 8 further comprising the one or more indented or recessed surfaces including one or more widthwise spaced apart indented or recessed surfaces defining a widthwise taper between the tab base.

12. The composite article as claimed in claim 11 further comprising the widthwise taper tapering down in thickness from the tab tip towards the tab base.

13. The composite article as claimed in claim 12 further comprising the ply edges of at least a second portion of the plies directly or indirectly contacting or pressing against the tab tip.

14. The composite article as claimed in claim 8 further comprising:
hooking means for hooking some of the plies of the composite airfoil,
the hooking means disposed along widthwise spaced apart tab first and second sides of the tab,
the hooking means including hooks disposed along lengthwise spaced apart tab first and second edges, and
the one or more indented or recessed surfaces including corners between the hooks and the widthwise spaced apart tab first and second sides.

15. The composite article as claimed in claim 14 further comprising the hooks including continuous leading first and second edge hook disposed along the lengthwise spaced apart tab first and second edges respectively.

16. The composite article as claimed in claim 14 further comprising the hooks including alternating first and second side hooks extending alternatingly outwardly from the tab first and second sides respectively along each of the lengthwise spaced apart tab first and second edges.

17. The composite article as claimed in claim 16 further comprising the hooks being stepped hooks and each of the stepped hooks including hook steps with runs widthwise separated by rises.

18. The composite article as claimed in claim 17 further comprising the rises having a height equal to or one or more times greater than a thickness of the plies.

19. A composite blade or vane comprising:
a composite airfoil including widthwise spaced apart airfoil pressure and suction sides extending heightwise or spanwise and outwardly from an airfoil base to an airfoil tip and lengthwise or chordwise between spaced apart airfoil leading and trailing edges,
the composite airfoil including plies having widthwise spaced apart ply pressure and suction sides and ply edges therebetween,
the composite airfoil mounted on a spar including a shank extending heightwise from below the airfoil base up through the airfoil base into the composite airfoil,
a tab at an upper end of shank and substantially or fully embedded in the composite airfoil,
the tab including spanwise spaced apart tab base and tab tip, and
the ply edges of at least a first portion of the plies directly or indirectly contacting or pressing against the tab.

20. The composite blade or vane as claimed in claim 19 further comprising one or more indented or recessed surfaces in the tab between heightwise spaced apart tab base and tab tip, and the ply edges of at least a first portion of the plies directly or indirectly contacting or pressing against the indented or recessed surfaces.

21. The composite blade or vane as claimed in claim 20 further comprising the ply edges of at least a second portion of the plies directly or indirectly contacting or pressing against the tab tip.

22. The composite blade or vane as claimed in claim 21 further comprising the one or more indented or recessed surfaces defining corresponding one or more indentations or recesses having circular cross sections.

23. The composite blade or vane as claimed in claim 21 further comprising the one or more indented or recessed surfaces including one or more widthwise spaced apart indented or recessed surfaces defining a widthwise taper between the tab base.

24. The composite blade or vane as claimed in claim 23 further comprising the widthwise taper tapering down in thickness from the tab tip towards the tab base.

25. The composite blade or vane as claimed in claim 24 further comprising the ply edges of at least a second portion of the plies directly or indirectly contacting or pressing against the tab tip.

26. The composite blade or vane as claimed in claim 21 further comprising:
hooking means for hooking some of the plies of the composite airfoil,
the hooking means disposed along widthwise spaced apart tab first and second sides of the tab,
the hooking means including hooks disposed along lengthwise spaced apart tab first and second edges, and
the one or more indented or recessed surfaces including corners between the hooks and the widthwise spaced apart tab first and second sides.

27. The composite blade or vane as claimed in claim 26 further comprising the hooks including continuous leading first and second edge hook disposed along the lengthwise spaced apart tab first and second edges respectively.

28. The composite blade or vane as claimed in claim 26 further comprising the hooks including alternating first and second side hooks extending alternatingly outwardly from the tab first and second sides respectively along each of the lengthwise spaced apart tab first and second edges.

29. The composite blade or vane as claimed in claim 28 further comprising the hooks being stepped hooks and each of the stepped hooks including hook steps with runs widthwise separated by rises.

30. The composite blade or vane as claimed in claim 29 further comprising the rises having a height equal to or one or more times greater than a thickness of the plies.

31. The composite blade or vane as claimed in claim 19 further comprising the spar being metallic.

\* \* \* \* \*